United States Patent [19]

Foldenauer

[11] Patent Number: 5,035,494
[45] Date of Patent: Jul. 30, 1991

[54] MOLDED PLASTIC ARTICLE ASSEMBLY MEANS

[75] Inventor: Kenneth J. Foldenauer, Anaheim, Calif.

[73] Assignee: V-Tech, Inc., Pomona, Calif.

[21] Appl. No.: 487,408

[22] Filed: Mar. 1, 1990

[51] Int. Cl.⁵ .................. G02B 21/34; G01N 21/01
[52] U.S. Cl. .................................. 350/536; 350/534; 403/282; 403/380; 403/345; 29/525
[58] Field of Search ............... 350/534, 535, 536; 403/282, 380, 345, 340; 29/525, 525.11

[56] References Cited

U.S. PATENT DOCUMENTS

| 3,432,275 | 3/1969 | Unger | 350/536 |
|---|---|---|---|
| 4,039,247 | 8/1977 | Lawman et al. | 350/536 |
| 4,599,315 | 7/1986 | Terasaki et al. | 350/536 |
| 4,607,921 | 8/1986 | Miller | 350/536 |
| 4,637,693 | 1/1987 | Mitchell | 350/536 |
| 4,722,598 | 2/1988 | Ford | 350/536 |

Primary Examiner—Jon W. Henry
Attorney, Agent, or Firm—Drucker & Sommers

[57] ABSTRACT

A apparatus for joining a pair of molded plastic pieces and an interference fit joint including a plurality of pegs on a first piece and a plurality of elongate sockets on a second piece. The elongate sockets have a first dimension less than 1.0 times the diameter of the pegs to achieve an interference fit and a second dimension of at least 1.25 times the diameter of the pegs. This invention has particular utility in the manufacture of disposable laboratory slides.

20 Claims, 3 Drawing Sheets

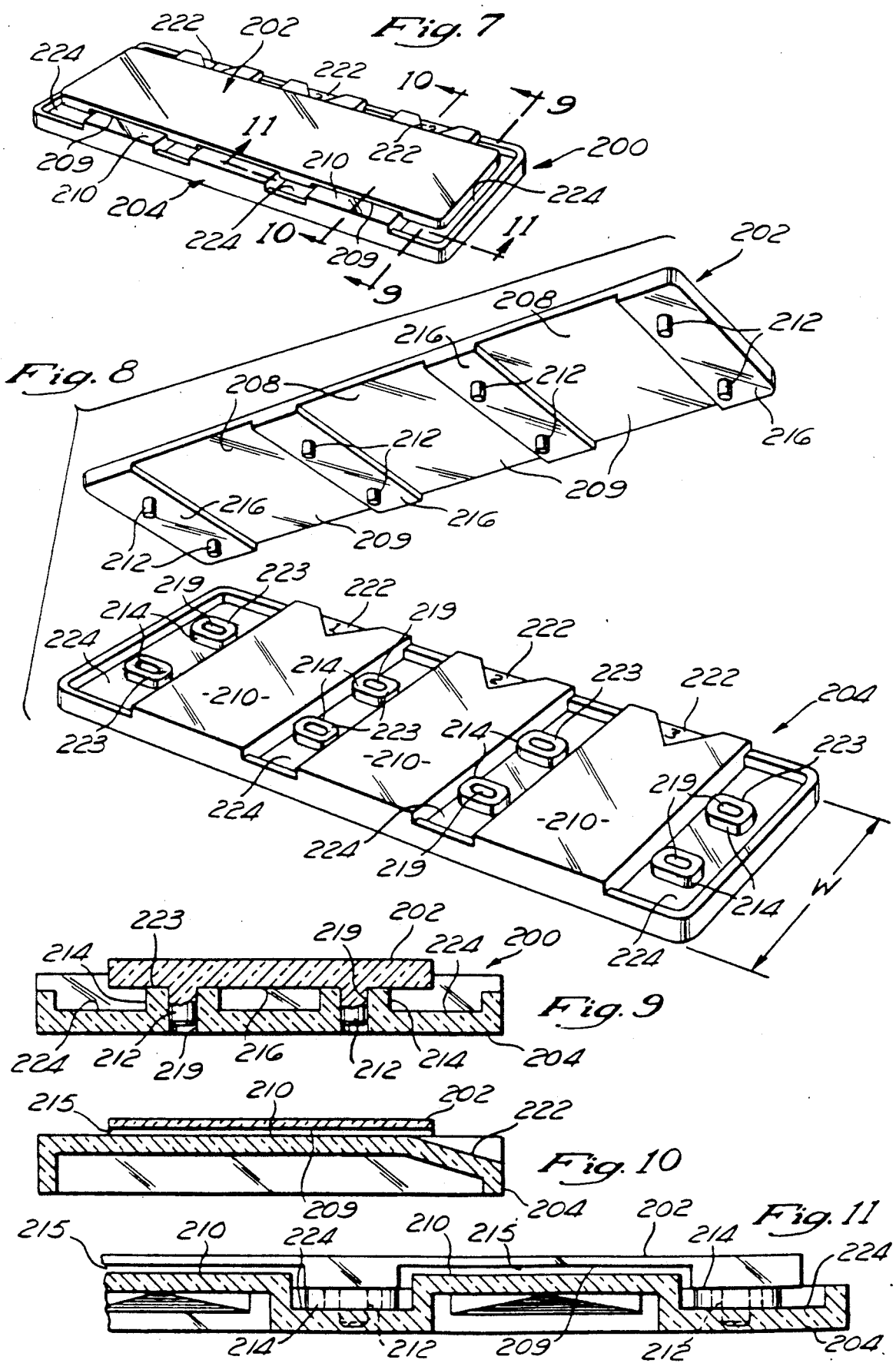

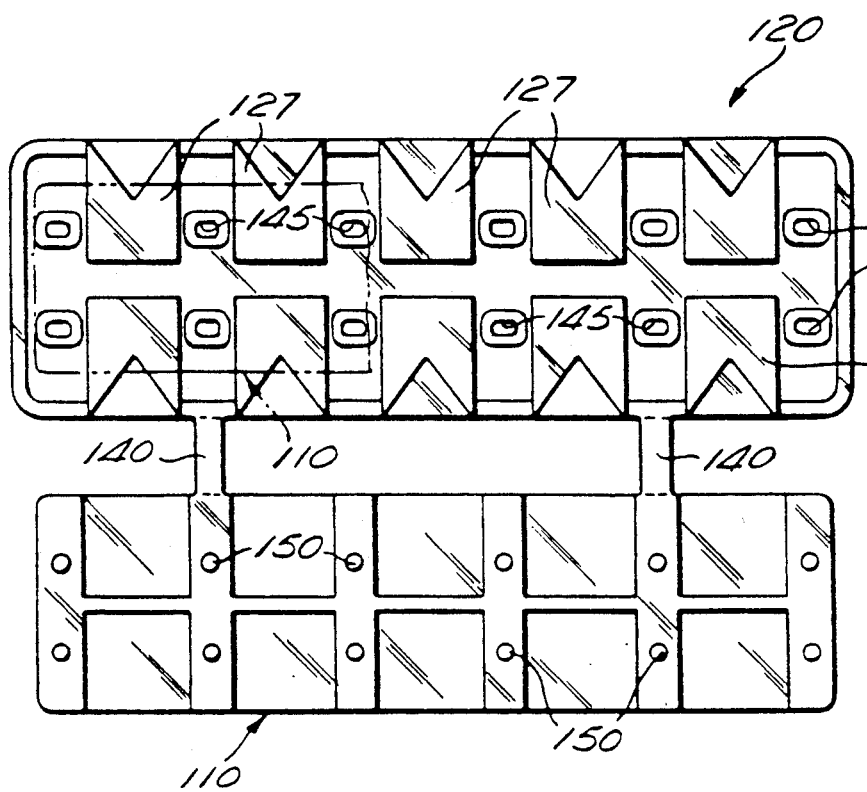
Fig. 5  Fig. 6
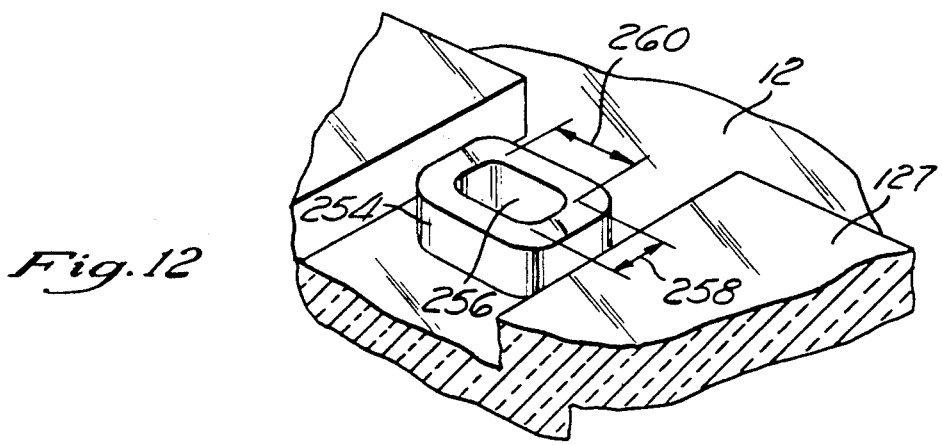
Fig. 12

MOLDED PLASTIC ARTICLE ASSEMBLY MEANS

FIELD OF THE INVENTION

This invention relates generally to apparatus for joining plastic workpieces and more particularly to apparatus for marking an improved transparent slide for receiving and retaining a thin film of a specimen before and during examination.

BACKGROUND OF THE INVENTION

Microscope slides can be made by joining a flat, transparent slide plate and a thin flat transparent cover slip over the specimen. Commercially made microscope slides, such as the one disclosed herein in detail, can be made by joining round pegs in mating round bases. The interference fit formed creates a unitary slide—cover slip that can be used for clinical testing.

One purpose for which a specimen so prepared is examined is to permit quantitative microscopic analysis of particulate matter in the fluid. Fluids which are typically examined by such procedures include urine, blood, spinal fluid, sputum and cell cultures. When the specimen has been spread to a film of generally uniform thickness, the technician is able to count the number of solid particles, cells and the like in a given area of the specimen and this count is indicative of the content of the specimen per unit volume thereof. The actual volume of fluid confined beneath a given area of the cover slip is dependent upon several variables, among them being the size of the drop of liquid applied to the slide plate, the viscosity of the fluid, the force applied in squeezing the glass cover slip against the plate and the flatness of the two elements in their confronting relationship. The distribution of solid particles in the specimen, particularly larger particles, can be affected by the squeezing action, and slippage can occur between the cover slip and the plate, thereby possibly adversely affecting the accuracy of the examination. Because the thickness of sample depends on the amount of sample placed on the slide, as much as a 50-200 percent error can be introduced.

Such microscope slides are usually made from molded glass. Plastic slides and cover slips, such as disclosed in U.S. Pat. No. 4,607,921 to Miller solve many of the problems associated with glass slides and cover slips. But, the plastic slide or cover slip can tend to warp slightly during the molding process. A warped slide will not mate properly with a warped coverslip. The resultant assembly will be itself warped. If the slide and coverslip are warped strongly enough one will not be able to join its partner.

Plastic slide warpage can be cured by a separate step wherein the finished slide is heated and pressed. But this adds another step in producing what is intended to be an inexpensive disposable item. Furthermore, if the warpage is so bad the parts can mate, then even this added step cannot cure the problem.

It would be advantageous to have a method of joining molded plastic pieces that allowed easy fit in slightly warped pieces. Especially preferable would be a method that corrected any warpage automatically.

SUMMARY OF THE INVENTION

This invention provides a apparatus for joining a pair of molded plastic pieces and an interference fit joint including a plurality of pegs on a first piece and a plurality of elongate sockets on a second piece. The elongate sockets have a first dimension less than 1.0 times the diameter of the pegs to achieve an interference fit and a second dimension of at least 1.25 times the diameter of the pegs. This invention has particular utility in the manufacture of disposable laboratory slides.

An aspect of this invention is an interference fit joint for molding plastic pieces having a plurality of interlocking joints comprising:

a plurality of pegs extending outwardly from a first piece; and a plurality of peg receivers each having an elongate receiving socket having a first dimension less than 1.0 times the diameter of said pegs to achieve an interference fit and a second dimension of at least 1.25 times the diameter of said pegs, on a second piece, whereby each peg is received by a peg receiver and the first piece is joined to the second piece.

A further aspect of this invention is a dual member transparent laboratory slide consisting of:

a base member having a bottom wall with an upper surface, said base member being integrally formed with at least one plate surface spaced above said upper surface, a fluid receiving surface communicating with said plate surface, and a plurality of reception sockets each having a first dimension less than 1.0 times a diameter dimension to achieve an interference fit and a second dimension of at least 1.25 times a diameter dimension;

a cover member formed with at least one cover slip having a lower surface adapted to be located in spaced confronting parallel relationship with respect to said plate surface, said cover member being integrally formed with a plurality of round pegs each having a diameter of the diameter dimension;

said base member and said cover member adapted to interconnect each of said plurality of said reception sockets with one of said pegs; and the reception sockets and the pegs being adapted to selectively provide a predetermined spacing.

BRIEF DESCRIPTION OF THE DRAWINGS

The objects, advantages, and features of this invention will be more readily apparent from a following detailed description when read in conjunction with the accompanying drawing, in which:

FIG. 5 is a plan view of a second embodiment of the base and cover slip members joined by a hinge means;

FIG. 6 is an end elevational view of the embodiment of FIG. 5;

FIG. 7 is a perspective view of a third embodiment of the base and cover slip members, in assembly, comprising the transparent slide of the present invention;

FIG. 8 is an exploded view of the third embodiment of transparent slide shown in FIG. 7; and FIGS. 9 to 11 are cross-sectional views of the assembled transparent slide, taken along the line 9—9, 10—10 and 11—11 of FIG. 7, respectively.

FIG. 12 shows a perspective view of a detail of the socket and elongate hole of this invention.

DESCRIPTION OF THE PREFERRED EMBODIMENTS

Figure 1:
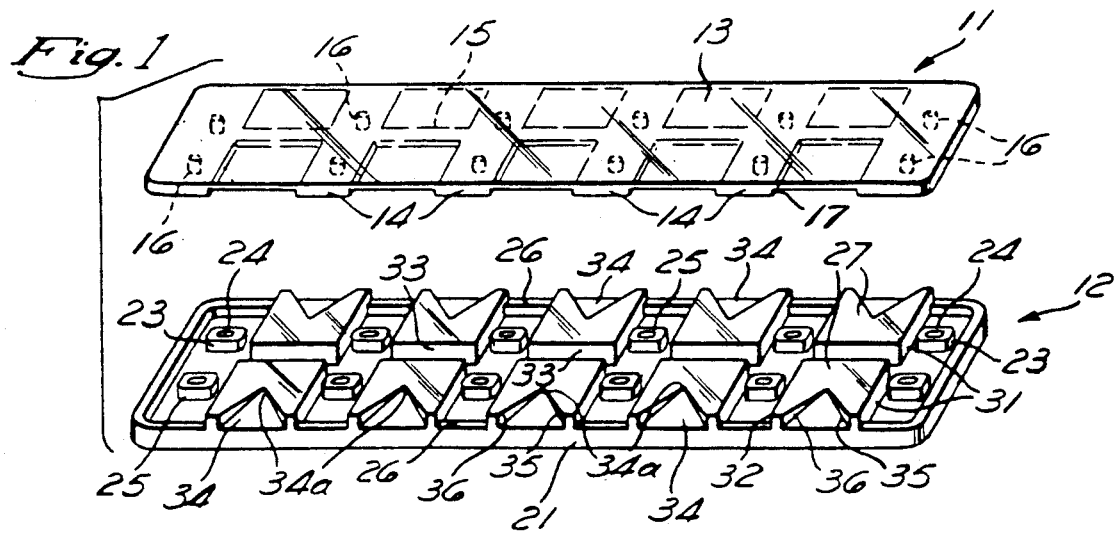
FIG. 1 is an exploded view of one embodiment of the base and cover slip members of the transparent slide of the present invention.

With reference now to the drawing, FIG. 1 shows cover member 11 in position above base member 12 for removable engagement therewith. The cover member 11 is formed with a plurality of cover slips 13 which are very thin, in the order of 0.004 inch (0.1 mm) to 0.0099 inch (0.25 mm). As shown in the drawing, cover slips 13 are spaced side by side longitudinally on the cover member 11, separated by supporting elements 14 which are substantially thicker than the cover slips and spaced from the lower surface of the cover slips by side walls 17. Cover slips 13 are positioned on opposite sides of the cover 11, separated by ribs 15 which are relatively narrow but typically of the same thickness as supporting elements 14. Round pegs 16 extend downwardly from the supporting elements and provide part of the means for interconnecting the cover 11 with the base member 12.

Figure 2:
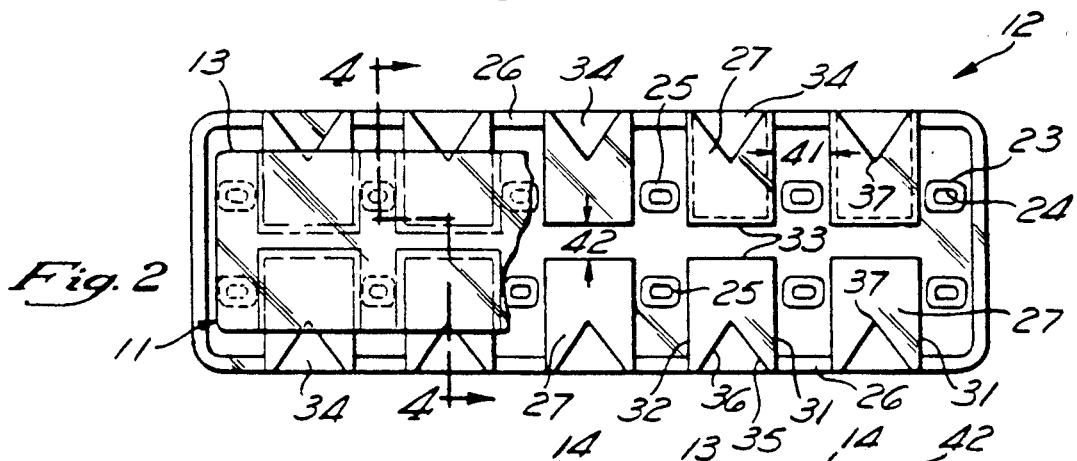
FIG. 2 is a top view of the slide of FIG. 1 with a portion of the cover slip broken away.
Figure 3:
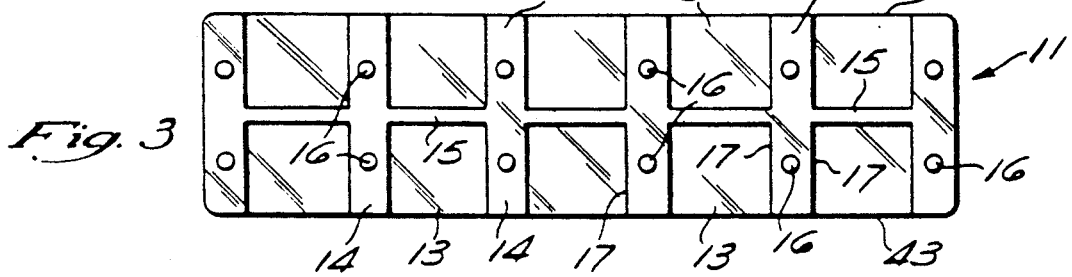
FIG. 3 is a bottom view of the cover slip of FIG. 1.
Figure 4:
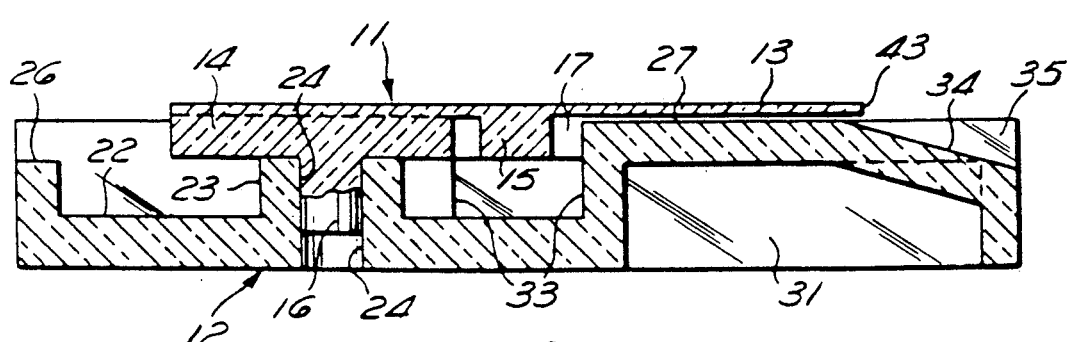
FIG. 4 is an enlarged sectional view taken along line 4—4 of FIG. 2.

Base member 12 is formed with a bottom wall 21 having an upper surface 22 and socket elements 23 are formed with holes 24 therein which are adapted to receive pegs 16 with supporting elements 14 resting on the top bearing surfaces 25 of the socket elements. The holes are elongate in socket elements 23. A first dimension is less than 1.0 times the diameter of the round peg 16, preferably between 0.75 and 1.0 times the diameter of the round pegs 16. A second dimension is at least 1.25 times the diameter of the round pegs 16. Preferably the second dimension is between 1.25 and 2.0 times the diameter of the round pegs. The second dimension is parallel to the long dimension of the slide. The outside dimensions of bottom wall 21 are defined by edge 26 which completely surrounds the bottom wall and functions as a stiffening element for the base member 12. The base member 12 is also formed with a plurality of platform surfaces of slide plates 27 spaced above upper surface 22 of the bottom wall by means of vertical walls 31, 32 and 33. The pegs form an interference fit with the first dimension of the socket. Communicating with plate 27 is fluid receiving surface 34 which is triangularly shaped and slopes away from the plate as is shown clearly in FIGS. 1 and 4. Each fluid receiving surface 34 is defined by walls 35 and 36 which, together with fluid receiving surface 34 further defines the fluid receiving groove or passage 37. It should be noted that the inner ends of walls 35 and 36 do not meet because the surfaces 27 and 34 are continuous through narrow passage 37 (FIG. 2).

Referring to FIG. 12, an elongate socket 145 extends upwardly from the base member 12. The socket provides a wall 254 that defines an elongate hole 256 to receive a peg from the cover member. The elongate socket has a first dimension 258 and a second dimension 260. The first dimension will be from 0.75 to 1.0 times the diameter of the peg and the second dimension will be at least 1.25 the diameter of the peg. It is preferred that the second dimension be between 1.25 and 2.0 times the diameter of the peg.

The elongate hole allows the peg/socket alignment to be off, still allowing the peg to be interference into the socket. Since the elongate hole has one dimension larger than the diameter of the peg, it might be assumed that the peg can move within the hole. But the first dimension is slightly smaller than the diameter of the peg. The tight interference fit formed does not allow the peg to move.

When the laboratory slide of this invention is to be used, cover element 11 is mounted to base 12, pegs 16 frictionally engaging holes 24 in socket elements 23 with supporting surfaces 14 resting upon rim 25 of the sockets. In this position, the bottom of cover slips 13 are spaced above plates 27 by a predetermined distance. That spacing is preferably in the range of 0.001 inch (0.0254 mm) and 0.004 inch (0.1 mm), but the structure is not so limited. This spacing constitutes a capillary specimen chamber wherein fluid to be examined is retained between the cover slip and the platform surface by capillary action of that fluid. Thus the spacing may be that which is appropriate for any particular fluid. The base and cover slip members are so constructed that the distance 41 (FIG. 2) between adjacent plates is greater than the width of supporting elements 15 of the cover member and the spacing 42 between adjacent plates is greater than the width of supporting elements 14 of the cover member and the spacing 42 between opposite plates is greater than the width of ribs 15. With this construction, it is readily apparent that the laboratory slide of this invention is an open system whereby all sides of the plate communicate with the external environment and there is no possibility of air being trapped within the capillary chamber when fluid is introduced therein.

As has been alluded to above, because fluids to be microscopically examined differ significantly in their viscosity, it is often desirable to employ laboratory slides where the capillary chambers are not all of the same spacing. By means of the present structure, it is possible to provide slides which are suited to specific fluids without any change in the principles of the invention. One means for providing a different capillary chamber spacing is to increase or decrease the height of socket elements 23. From FIG. 4 it is apparent that an increase in height of the socket element 23, without any change in the cover member 11, will increase the spacing between cover slip 13 and plate 27 to accommodate a fluid of greater viscosity. Conversely, shortened socket element 23 will narrow the capillary chamber for lower viscosity fluids. Alternately, the thickness of support surface 14 can be increased or decreased with the same effect. It should be noted that only one of the two members, the base member or the cover member, need to be formed with elements of different sizes to change the capillary chamber thickness. The other member can be standard for all examination purposes. Another means by which to provide different capillary chamber spacing is to make holes 24 blind and varying the length of pegs 16. In that event, making the pegs longer would increase the chamber spacing and supporting elements 14 would not necessarily rest upon the tops of sockets 23.

The simple peg and elongate socket are sufficient to provide the spacing and hold required for the finished slide. The elongate sockets allow the user to assemble the slide and coverslip at the time of use. In this manner the assembled unit can be customized in the laboratory. Once the coverslip and the slide are mated the joint is permanent. To form a usable joint that holds the slide at a predetermined distance, the first dimension will typically be slightly smaller than the diameter of the pin. The interference fit that results between the slide and the coverslip is tight and not releasable.

In accordance with known microscopic examination techniques, the laboratory slide of this invention provides both low power with a magnification factor of about 100 and high power with a magnification of 450 to 550. It is also possible to employ the slide of this invention for oil immersion whereby the magnification factor can be increased to 100. As is well known, the cover slip protects the objective of the microscope from becoming contaminated by contact with the fluid being examined. In the same way that it provides protection for the microscope and the fluid, it can support a drop of oil into which the objective can be placed for increased magnification without contaminating either the objective or the fluid under examination. Because of the fact that the cover slip of this laboratory slide can be made very thin, without fear of undue warpage its optical characteristics are excellent and generally better than those of the one piece molded slide previously available.

When the laboratory slide of this invention is to be used for examination of fluids, and the base member and cover elements have been secured together, it may be seen that the outer edge 43 of the cover slip extends slightly over the narrow portion of fluid receiving surface 34 where it communicates through passage 37 with plate surface 27. It should be noted that the fluid receiving surface may have various shapes but preferably is triangular so that its innermost apex 34a serves as a locator for a pipette end; the fluid receiving surface 34 communicates with plate 27 and is configured as to facilitate fluid migration into the specimen chamber by capillary action. With reference to FIG. 2, the slide should be tilted to a somewhat vertical position so that fluid receiving areas on one side open upward. A drop of fluid placed in one fluid receiving area will migrate by capillary action into the capillary chamber beneath cover slip 13 and on top of plate surface 27 and the air which is normally between these two surfaces can escape in any direction from between them.

Several different specimens may be placed in the laboratory slide, one specimen in each of the numbered areas so that several may be examined on one laboratory slide. Upon completion of the examination of the fluids in the specimen chambers, the slide may be disposed of. For indexing purposes the numerals may be provided on the under side of fluid receiving surface 34, but that convenience is not necessary. Although users normally find the multiple slid arrangement to be desirable, it is possible that some people would want a single or possibly a dual slide configuration. This invention is not limited to any particular number of slides.

It should be noted that the capillary chamber can be made with any desired spacing between the plate and the cover slip and is not limited by the molding process as is true of some of the prior art devices. By fabricating the plate and cover slip separately, the spacing of the capillary chamber can be made significantly thinner than those of prior art, thus allowing a single layer of specimen to be viewed. This structure enhances the accuracy of examination made. When the fluid is placed in a chamber, excess fluid can be conveniently removed by tilting the slide and allowing such excess to fall off. The liquid in the capillary chamber will be retained therein by capillary action.

The material of both elements of the slide of this invention is preferably plastic, being optically transparent, having the desired degree of wettability and can be conveniently injection molded. Examples of plastics which are satisfactory for this purpose include cellulose ester compositions such as cellulose acetate and cellulose acetate butyrate. A number of other plastics could also be satisfactory.

Referring now to FIGS. 5 and 6, the base 120 and cover members 110 could be molded as a single integral piece with a plastic hinge 140 between them. In this way, the elements would never become separated from one another and the cover element 110 could easily be folded over onto the base member 120 so that the pegs 150 engage the elongate socket elements 145. The elongate socket holes provide a particularly convenient method of aligning a slide of this embodiment slight warpages in either the base or cover member can prevent closure of the integral slide when using round sockets. But the elongate socket allow for correction of warpage, and provide convenient mating.

Although hinges of simple strips of plastic could be affixed along either the long or short sides of the slide and cover slip, for accuracy of fabrication, it is presently preferred to place the hinges 140 along the long edges in order to reduce tooling costs.

The embodiment of FIGS. 5 and 6 is particularly useful in an application of the present invention wherein specimens are placed on the plate surface 127 and the hinged cover slip 110 is attached. This application is of particular usefulness in instances such as those that arise in the field of bacteriology (i.e. in testing for gonorrhea) where a series of stains must be applied to a specimen before microscopic viewing.

Grid marks or lines indicate different examination fields might be incorporated in the fabrication of the cover or base member. A portion of the slide might be formed of frosted plastic for application of indicia for identification purposes.

In the third embodiment using this invention, shown in FIGS. 7-11, the examination areas defined by the plurality of plate surfaces and confronting cover slips, are each substantially coextensive with the width W of the transparent slide. That is to say, each examination are is over twice as large, in area, as the first and second embodiments heretofore described in FIGS. 1-6—even though the overall width of the transparent slide in the third embodiment of FIGS. 7-11 is the same as that of the FIGS. 1-6 embodiments. The enlarged examination area is especially suitable in the examination of specimens requiring larger examination areas such as parasites in stool samples and monoclonal antibodies in blood plasma.

More particularly, the slide of the FIG. 7-11 embodiment is designated generally by the numeral 200. The cover member is designated by the numeral 202 and the base member as 204.

The cover members is formed with a plurality of cover slips 208, each having a lower surface 209 located in spaced confronting relationship to a plurality of plate surfaces 210 in the base member 204 when the cover and base members 202, 204 are assembled by respective peg and elongate socket interconnecting means 212, 214.

The post and socket interconnecting means 212, 214 removably interconnect, or attach, the cover and base members 202, 204. In the interconnected position (i.e. the fully assembled position shown in FIGS. 7 and 9-11), the cover slips 209 are spaced a predetermined distance 215 from the plate surfaces 210, the spacing 215 between plate surface 210, the spacing 215 between plate surface 209 and cover slip 210 (preferably about 0.0254 mm to 0.1 mm) being reproducibly achieved by means of predetermining the dimensions of the thickness of supporting surfaces 216 which separate cover slips 208, and/or the height of sockets 214. Thus, when the supporting surfaces 216 lie in abutment with the top rim 223 of the sockets 214 (the pegs or posts 212 frictionally engaging the holes 219 of the sockets 214, as described with reference to the Figures 1O5 embodiment), the spacing 215 is predetermined to very close tolerances. When either of the socket height or thickness of supporting surface 216 is changed, spacing 215 will be varied.

Each plate surface 209 has a fluid receiving surface 222 shaped in the same manner as described with reference to FIGS. 1-5. The supporting surfaces 216 are formed on opposite sides of cover slips 208 and extend below the cover slip surface 209 (see FIG. 11).

The cover member 202 does not have a rib element as in FIGS. 1-5 since the cover slips 209 extend entirely from side to side of the cover member 202 and together with plate surfaces 210 (which also extend entirely from side to side of base member 204—except for fluid receiving area 222) define an examination area over twice the size of the examination area of the Figures 1O5 embodiment.

It is to be noted that in the third embodiment using this invention, the examination chamber is open along all sides, as in the FIGS. 1-5 embodiment, so that excess fluid deposited in an examination chamber may overflow into side channels 224. This third embodiment is thus an open system as with the FIGS. 1-5 embodiment. In the FIGS. 1-5 embodiment, however, the overflow fluid can be deposited not only into side channels, but into an end channel, defined by vertical walls 33, as well.

I claim:

1. An interference fit joint for molded plastic pieces having a plurality of interlocking joints comprising:
   a plurality of pegs having a circular cross section having a diameter extending outwardly from a first piece; and
   a plurality of peg receivers on a second piece, each having an elongate receiving hollow having a first dimension 1.0 times the diameter of said pegs to achieve an interference fit and a second dimension of at least 1.25 the diameter of said pegs, whereby each peg is received by a peg receiver and the first piece is joined to the second piece.

2. The interference fit joint of claim 1, wherein the second piece has a long and a short dimension and said second dimension of said receiving hollow is in the same direction as the longest dimension of the second piece.

3. A dual member transparent laboratory slide consisting of:
   a cover member formed with at least one coverslip having a lower surface adapted to be located in spaced confronting parallel relationship with respect to a plate surface, said cover member being integrally formed with a plurality of pegs having circular cross section having a diameter;
   a base member having a bottom wall with an upper surface, said base member being integrally formed with at least one plate surface spaced above said upper surface, a fluid receiving surface communicating with said plate surface, and a plurality of reception sockets each having a first dimension less than 1.0 times the diameter of the pegs to achieve an interference fit and a second dimension of at least 1.25 times the diameter of the pegs;
   said base member and said cover member adapted to interconnect each of said plurality of said reception sockets with one of said pegs;
   the reception sockets and the pegs being adapted to selectively provide a predetermined spaced.

4. The laboratory slide recited in claim 3, wherein said fluid receiving surface is a flat triangularly shaped surface depressed from said plate surface and opening toward the outside edge of said base member.

5. The laboratory slide recited in claim 3, wherein said first interconnecting means comprises at least one socket element extending upwardly from said upper surface and having a hole therein;
   said second interconnecting means comprises at least one peg projecting downwardly from said cover member, said peg being permanently frictionally receivable in said hole in said socket element.

6. The laboratory slide recited in claim 5, wherein the bottom of said hole is closed, thereby allowing spacing between said cover slip and said plate surface to be determined by the length of said peg.

7. The laboratory slide recited in claim 5, wherein the socket includes a socket element, thereby allowing the predetermined spacing between said cover slip and said plate surface to be determined by the height of said socket element above said upper surface.

8. The laboratory slide recited in claim 3, wherein said cover member is formed with supporting elements on opposite sides of each said cover slip, and said supporting elements are spaced below said lower surface.

9. The laboratory slide recited in claim 8, wherein the supporting elements include spacing elements thereby allowing spacing between said cover slip and said plate surface to be determined by the thickness of said spacing elements.

10. The laboratory slide recited in claim 8, wherein said plate surface and each confronting cover slip lower surface extends substantially the entire width of the laboratory slide for maximum viewing.

11. The laboratory slide recited in claim 3, wherein said cover member is formed with supporting elements on opposite sides of each said cover slip, said supporting elements are spaced below said lower surface, and a rib element interconnects said supporting elements and extends downwardly from said cover slip.

12. The laboratory slide recited in claim 3, wherein the spacing between said cover slip and said plate surfaces ranges between about 0.0254 mm and about 0.1 mm.

13. The laboratory slide recited in claim 3, wherein said cover member and said base member are hingeably attached to each other.

14. The laboratory slide recited in claim 3, wherein each plate surface and each confronting cover slip lower surface extends substantially the entire width of the laboratory slide for maximum viewing.

15. The laboratory slide recited in claim 14, wherein said fluid receiving surface is a flat triangularly shaped surface depressed from said plate surface and opening toward the outside edge of said base member.

16. The laboratory slide recited in claim 14, wherein said cover member is formed with supporting elements on opposite sides of each said cover slip. and said supporting elements are spaced below said lower surface;
   thereby allowing spacing between said cover slip and said plate surface to be determined by the thickness of said supporting elements.

17. The laboratory slide recited in claim 14, wherein the spacing between said cover slip and said plate surfaces ranges between about 0.0254 mm and about 0.1 mm.

18. The laboratory slide recited in claim 14, wherein said cover member and said base member are hingeably attached to each other.

19. The laboratory slide recited in claim 14, wherein said first interconnecting means comprises at least one socket element extending upwardly from said upper surface and having a hole therein; and
said second interconnecting means comprises at least one peg projecting downwardly from said cover member, said peg being removably frictionally receivable in said hole in said socket element.

20. The laboratory slide recited in claim 19, wherein the bottom of said hole is closed, thereby allowing the spacing between said cover slip and said plate surface to be determined by the length of said peg.

* * * * *